(No Model.) 8 Sheets—Sheet 1.

I. FRÉCHETTE.
MACHINE FOR MAKING CONTINUOUS LENGTHS OF WIRE NAILS.

No. 588,137. Patented Aug. 17, 1897.

FIG. 1

Witnesses
Alp. Waller
L. Greenberg

Isaïe Fréchette
Inventor
Per J. Emile Vanier
Attorney

(No Model.)  8 Sheets—Sheet 7.

I. FRÉCHETTE.
MACHINE FOR MAKING CONTINUOUS LENGTHS OF WIRE NAILS.

No. 588,137.  Patented Aug. 17, 1897.

Fig. 7

Witnesses
Alp. Walter
L. Greenberg

Isaie Fréchette
Inventor
Per: J. Emile Vanier
Attorney

(No Model.)
8 Sheets—Sheet 8.

I. FRÉCHETTE.
MACHINE FOR MAKING CONTINUOUS LENGTHS OF WIRE NAILS.

No. 588,137.
Patented Aug. 17, 1897.

Witnesses
Alf. Walter
L. Greenberg

Isaie Fréchette
Inventor
Per: 
Attorney

UNITED STATES PATENT OFFICE.

ISAÏE FRÉCHETTE, OF MONTREAL, CANADA.

MACHINE FOR MAKING CONTINUOUS LENGTHS OF WIRE NAILS.

SPECIFICATION forming part of Letters Patent No. 588,137, dated August 17, 1897.

Application filed November 18, 1896. Serial No. 612,447. (No model.)

*To all whom it may concern:*

Be it known that I, ISAÏE FRÉCHETTE, a citizen of the Dominion of Canada, residing in the city and district of Montreal, in the Province of Quebec, Canada, have invented certain new and useful Improvements in Machines for Making Continuous Lengths of Wire Nails; and I do hereby declare the following to be a full, clear, and exact description of the invention, such as will enable others skilled in the art to which it appertains to make and use the same.

My invention has reference to a machine that makes a continuous length of wire nails for boots and shoes and other purposes in such a way that the points are beveled on one side only, and that the heads have the appearance of ordinary tack-heads and are capable of being wound around a reel the same as an ordinary piece of wire, the whole as more fully explained hereinafter, its object being to make the nails, as mentioned above, to be driven by a special machine requiring such.

Referring to the drawings similar letters and numerals refer to similar parts throughout the several views.

Figs. 8, 10, 12, and 14 are all plan views, on a large scale, of the clamps to secure the wire and sections of the cutter, while Fig. 19 is also an elevation of my cutter as it is located after cutting away a portion of the wire to form the point of the nail, while

Figure 1:
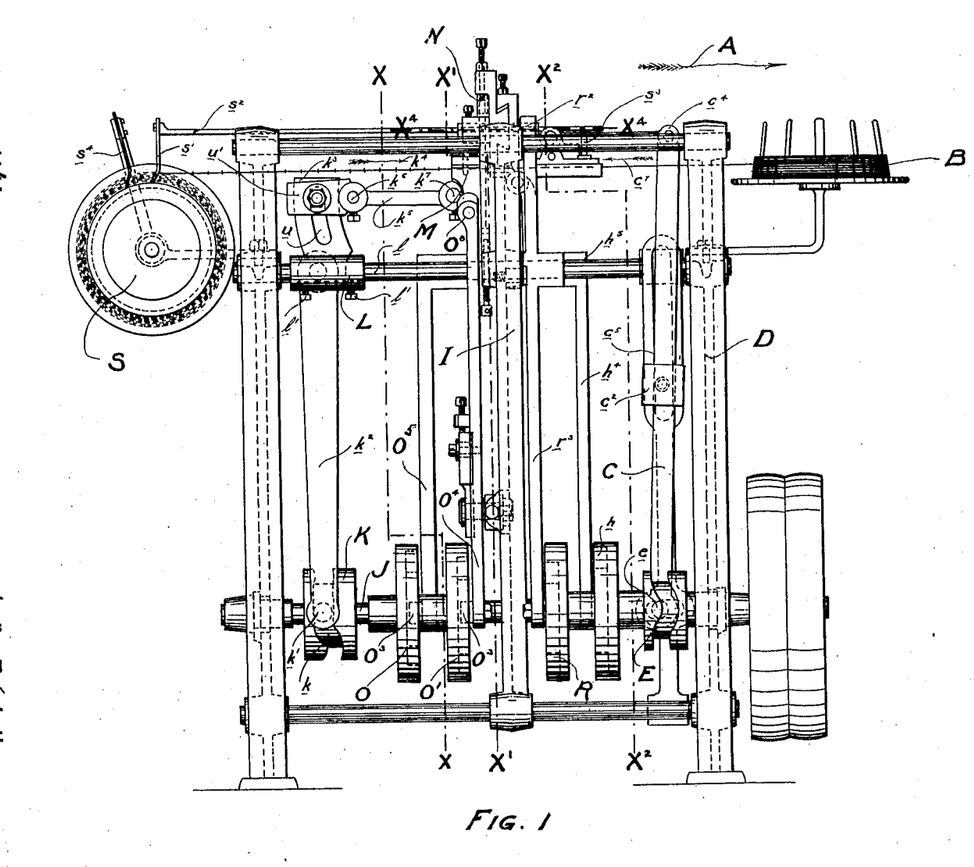
Figure 1 is a front elevation.
Figure 2:
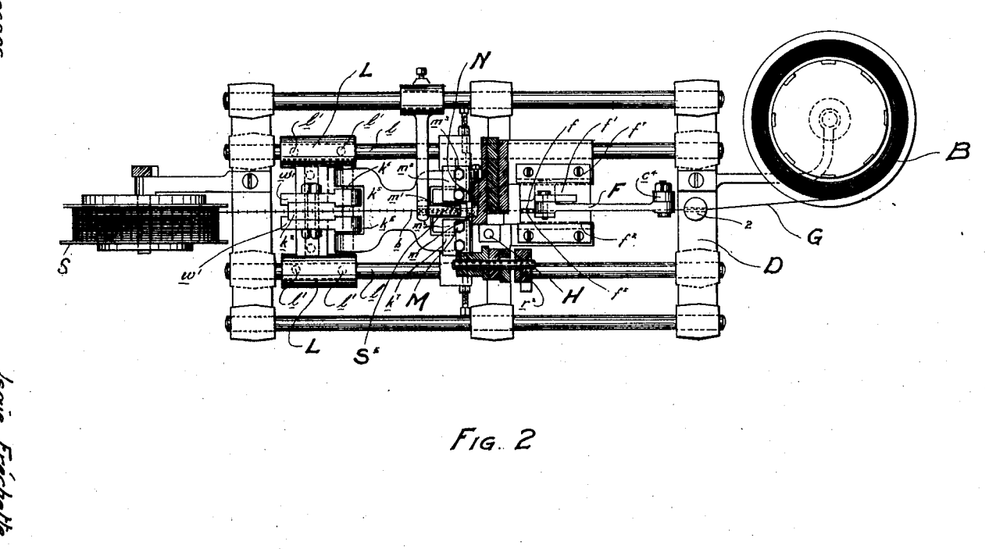
Fig. 2 is a plan view, shown part in section, along line $x^4$ $x^4$ of Fig. 1 and $x^4$ $x^4$ of Fig. 5.

The wire out of which nails are to be made is wound around a reel B and is passed through a guide 2, Fig. 2, which puts a certain tension on the wire, then in a groove or channel 3 in the block 4, inserted in the cross-head $f'$, and then out through the guide-tube $S^5$ to about a point $b$, when the machine is set in motion, the first operation which takes place being the feeding or the advancing of the wire of a length equal to the length of the nail wanted to be made. This is done by means of the lever C, fulcrumed at $c'$ to the block $c^2$, which is capable of sliding vertically in a slot (shown at $c^5$ in Fig. 1) in the piece $c^3$, which is secured to the frame D of my machine, as shown on Fig. 6. The object of having the block $c^2$ slidable vertically is to adjust the swinging of the head $c^4$ of the lever C, and thus regulate the length of the feed and consequently the length of the nail. The lever C is operated by means of the cam E, acting on the trundle-roll $c^6$, (shown in pointed lines on Fig. 6,) which is secured to the lower extremity of the lever C, when it passes over the ridge $e$, throwing the head $e^4$ of the lever C in the direction $c^7$, Fig. 1. This moves the rod F, Figs. 2 and 7, which is secured to it at one end and to the rocking or oscillating head $f$ of the cross-head $f'$ at the other, the latter sliding in the guides $f^2$, Figs. 2 and 6.

Figure 5:
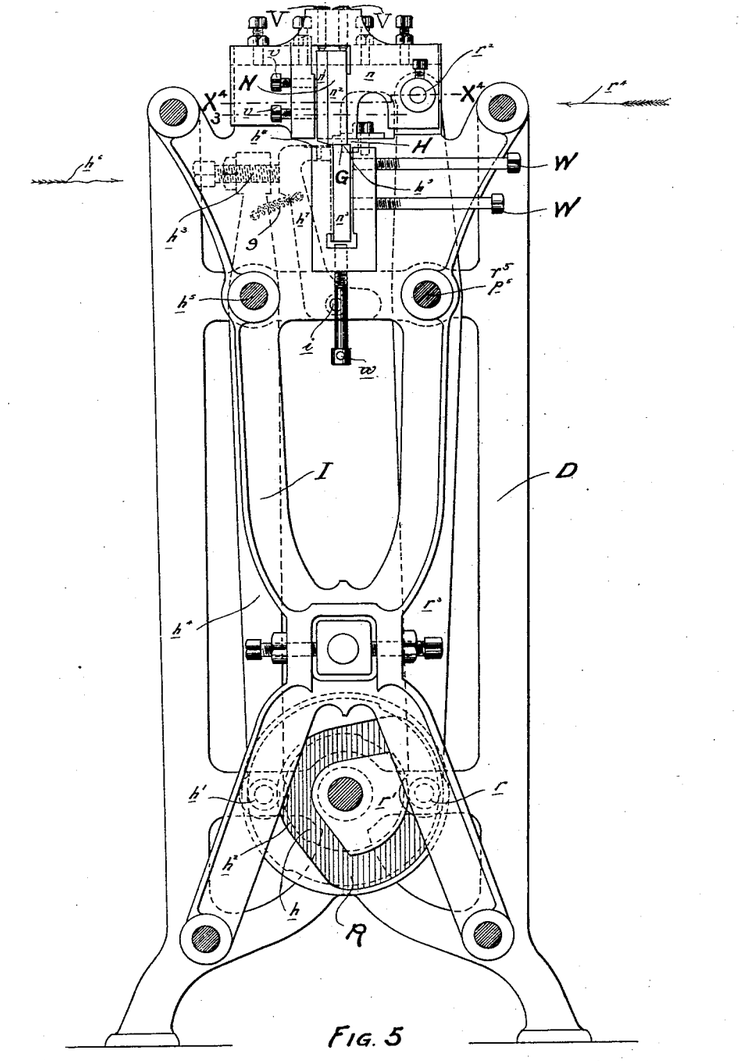
Fig. 5 is a vertical section on line X' X' of Fig. 1, looking in the same direction as above.
Figure 6:
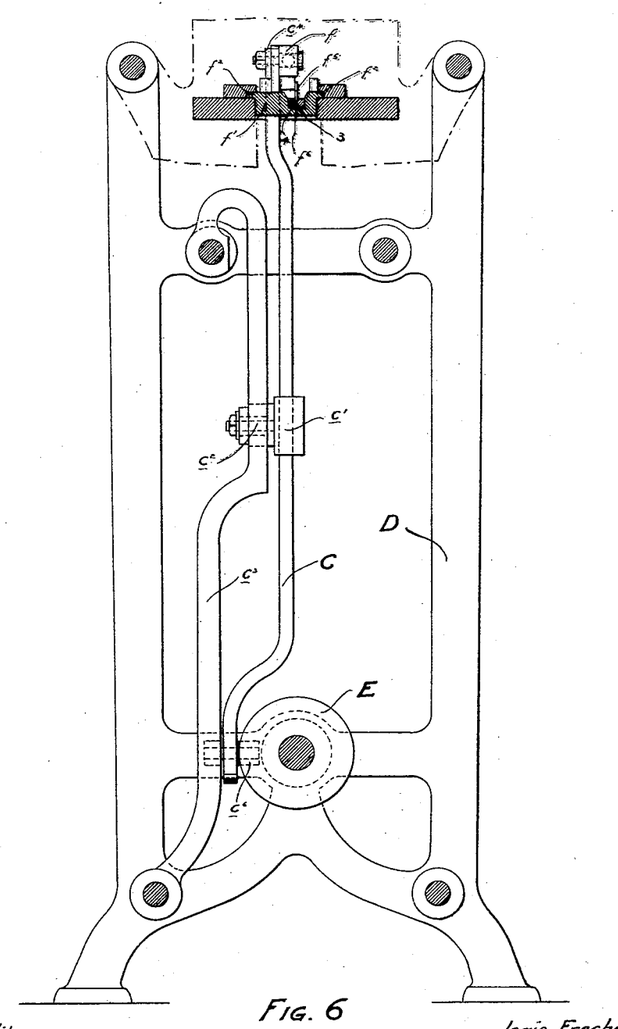
Fig. 6 is a vertical section on line $X^2$ $X^2$ of Fig. 1, also looking in the same direction as above.
Figure 7:
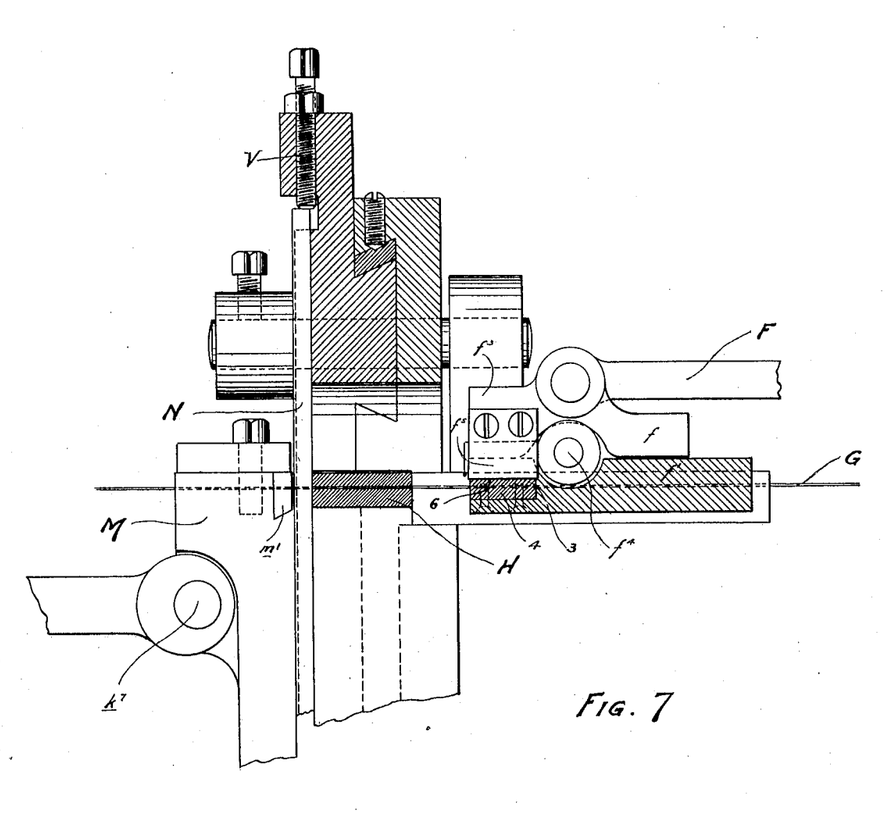
Fig. 7 is a longitudinal vertical section through the working head along the wire.
Figure 9:
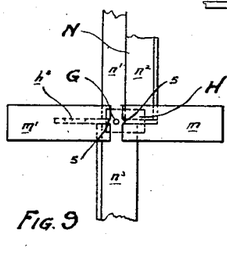
Figs. 9, 11, 13, and 15 are all elevations, on a large scale, of one of the wire-clamps and of the cutter, being the elevation looking in the directions of the arrows in Figs. 8, 10, 12, and 14 of the latter views, Fig. 16 being an end view of the clamps shown on the right-hand side of Figs. 8, 10, 12, and 14.
Figure 10:
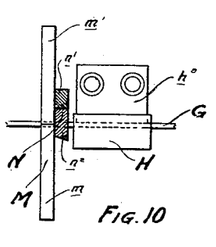
Figure 11:
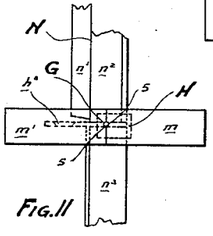
Figure 12:
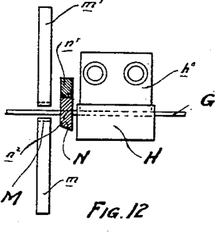
Figure 13:
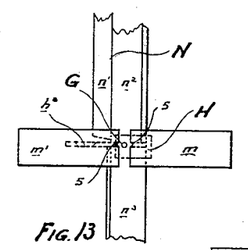
Figure 14:
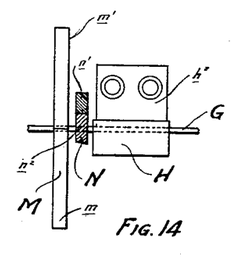
Figure 15:
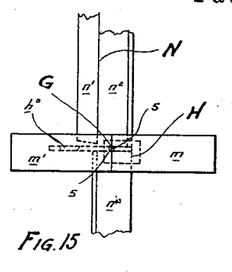
Figure 16:
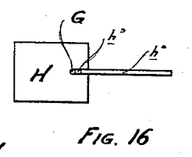
Figures 17, 18:
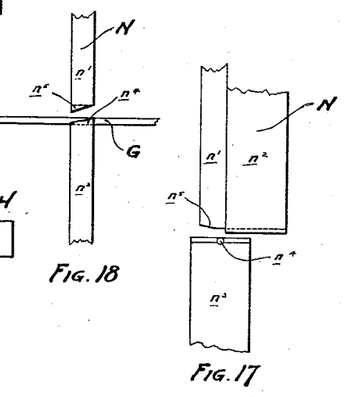
Fig. 17 is an elevation of my cutter, shown somewhat separated.
Fig. 18 is a side view of same.
Figure 19:
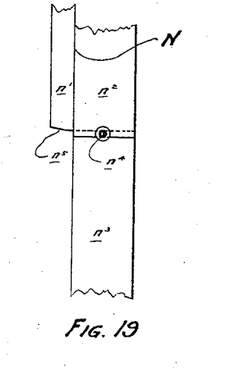
Figure 20:
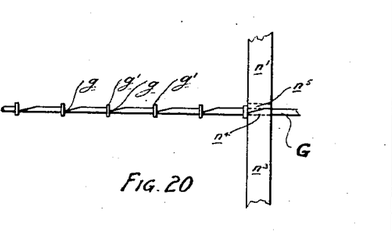
Fig. 20 is a side view of the same.

As can be seen in Figs. 6 and 7, when the piece or arm F pushes on the rocking or oscillating head $f$ of the cross-head $f'$ the former's front end $f^3$ is forced downward, turning upon the bearing-pin $f^4$, and since to its forward end $f^3$ is secured the thin clamping plate or piece $f^5$, Figs. 2, 6, and 7, in any suitable way, and, projecting downward a certain distance below the head $f$, its lower edge comes down on the wire G, placed in the groove or channel 3 in the block 4, which is secured to the cross-head $f'$, and firmly squeezes it against the bottom of the channel or groove 3 at $f^6$, Fig. 6, and the rod or arm F, still pushing the cross-head $f'$, carries the wire G along with it, bringing the former snug up against the clamping-block H, Figs. 2 and 7. Just as this is done the cam $h$, Figs. 1 and 5, is so timed that the trundle-roll $h'$, all in pointed lines on Fig. 5, in passing over the ridge $h^2$ forces the upper end $h^3$ of the lever $h^4$, which is offset at its point of oscillation $h^5$, to move in the direction $h^6$, Fig. 5, and consequently pushes against the arm $h^7$, Fig. 5, in pointed lines, pivoted to the frame I of my machine at $i$ and provided at its upper end with a thin metallic clamping piece or plate $h^8$, Figs. 5, 8, 9, 10, 11, 12, 13, 14, 15, and 16, which is normally in the position shown in Figs. 5 and 8—that is, away from the wire G, that passes in the channel or groove $h^9$, Figs. 5 and 16, of the clamping-block H, which is securely fastened to the frame of the machine in any suitable way; but as the arm $h^7$ is forced inward in the direction $h^6$, Fig. 5, by the end $h^3$ of lever $h^4$ the clamping piece or plate $h^8$ presses firmly against the wire G and securely clamps it against the bottom of the groove or channel $h^9$ in the clamping-block H, Fig. 16, so that the wire is then clamped by means of the piece $f^5$, Fig. 7, pressing it against the cross-head $f'$, and by means of the clamping piece or plate $h^8$, Fig. 8, holding it firmly in the bottom of the groove or channel $h^9$ in the block H, as shown on Fig. 10, and as the main shaft J, on which is mounted the various cams, continues to turn the cam K is so timed that as soon as the above operations have taken place its curve $k$ is entered by the trundle-roll $k'$, secured to the end of the lever $k^2$, and forces its upper end $k^3$ in the direction $k^4$, Fig. 1. As it is pivoted between the blocks L, placed on the rods $l$, Fig. 2, these blocks L can be adjusted by sliding them on the rods $l$ and clamping where desired by means of set-screws $l'$.

Figure 3:
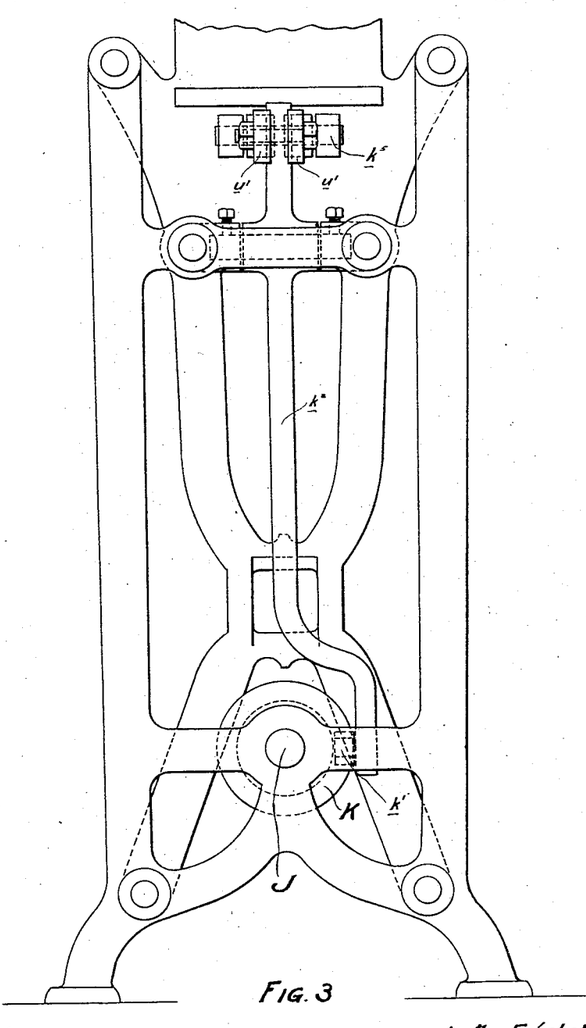
Fig. 3 is an end view taken by looking at the machine in the direction of the arrow A in Fig. 1.
Figure 4:
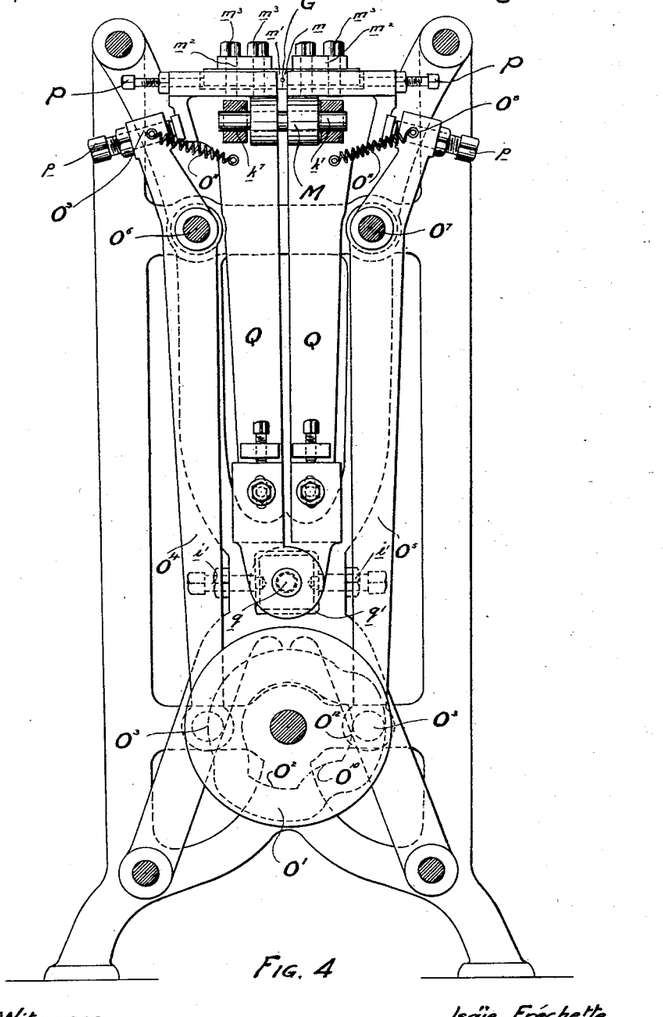
Fig. 4 is a vertical section on line X X of Fig. 1, looking in the direction of the arrow A in Fig. 1.

Now as the head $k^3$ of the lever $k^2$ is made to move in the direction $k^4$, Fig. 1, it pushes the double-forked arm $k^5$, which has one of its ends pivoted to it at $k^6$, and consequently pushes the clamping device M, to which its other extremity is pivoted at $k^7$, Figs. 1, 2, and 4. Normally this clamping device M is a certain distance away from my cutter N and also from the wire G, as shown on Fig. 12, (only the clamping-tools are there shown,) but the arm $k^5$ shoves it up close to the cutter N, as shown on Figs. 7 and 8, when the trundle-roll $k'$ of the lever $k^2$, Figs. 1 and 3, engages itself in the curve $k$ of the cam K; but as soon as this takes place the cams O and O', Fig. 1, are timed so as to bring the raised portions $O^2$ in contact with the trundle-rolls $O^3$, secured to the end of the levers $O^4$ and $O^5$, the function of which is to operate the clamp-holders Q, which are more fully described hereinafter. The cams O and O' force the lower end portions of the levers $O^4$ and $O^5$ apart, the lever $O^4$ being offset at its pivoting-point $O^6$, Figs. 1 and 4, while the lever $O^5$ is pivoted at $O^7$ to the rod $l$, and thus force their upper ends $O^8$ and $O^9$, Fig. 4, toward each other, but in so doing they come in contact with the clamp-holders Q, pivoted at $q$ to the square block or frame $q'$, which in turn is pivoted on the screws $i'\ i'$, secured to the frame I, so that they can close in toward each other like pincers and also swing back and forth longitudinally of the wire G on the screws $i'\ i'$. However, when they close in toward each other the two clamping-pieces $m$ and $m'$, Figs. 4, 2, 8, 9, 10, 11, 12, 13, 14, and 15, which are firmly secured to them by means of plates $m^2$ and set-screws $m^3$, grip the wire G between them, as shown on Figs. 4, 10, and 11, so that the wire is rigidly secured on both sides of the cutter N and close up to same, and it is now the turn of the cam R, Figs. 1 and 5, to act, which it does by forcing the trundle-roll $r$, Fig. 5, over the portion $r'$, and thus forces the upper end $r^2$ of the lever $r^3$, which is pivoted at $r^5$, in the direction $r^4$, Fig. 5, and as this end $r^2$ is joined to the cross-slide $n$, as shown on Figs. 1, 2, and 5, it follows that this slide, which holds the cutter N, is also made to go in the direction $r^4$.

Now, as can be seen on Figs. 17, 18, 19, and 20, my cutter N, which makes the points of the nails, is composed of two pieces $n'$ and $n^2$. The one, $n^2$, is the cutter proper, for the portion $n'$ really only serves to firmly hold down the wire, while the portion $n^2$ cuts away a piece of the wire, leaving the ends of the nails pointed by being beveled on one side only, as shown on Fig. 20 at $g$, the piece $n^3$ having its top beveled off in such a way as to exactly correspond to the beveling on the cutter $n^2$, so that when in operation they are in close contact, as shown on Fig. 19, while in Fig. 17 they are shown apart, so as to render the whole more easy to understand. The wire G passes in a small channel $n^4$ of its exact size and just deep enough to regulate the amount of the cut, so that when the cross-slide $n$ is set in motion the portion $n'$ of my cutter N passes over the wire placed in the channel $n^4$, and as it is slightly rounded off at $n^5$ it does not catch onto the wire and pull it out of the channel $n^4$, but on the contrary forces it down more firmly than ever, so that when the cutter $n^2$ touches the wire G it is so firmly held that a portion $g$ is cut right out by the projecting end of the cutter proper, $n^2$, and the cutter N then occupies the position shown on Fig. 19, where it remains during the next operation, which consists in making the head $g'$, Fig. 20. This is done as follows: The cams O and O' continuing to turn, the trundle-rolls $O^3$ drop into the depression $O^{10}$ and thus force the ends $O^8$ and $O^9$ of the levers $O^5$ and $O^4$ away from each other, and the springs $O^{11}$ draw back the clamp-holders Q, so that the wire G is released by the pincers, composed of the arms or clamp-holders Q, having the clamping-pieces $m$ and $m'$ secured to their upper ends, but at the same instant the cam K acts on the lever $k^2$ by its trundle-roll $k'$ running off the deviation $k$ and forces its end $k^3$ in an opposite direction to that shown at $k^4$, Fig. 1, or away from the cutter N, thus bringing the clamps $m$ and $m'$ in the position shown in Figs. 12 and 13, when the trundle-rolls $O^3$ pass over the projection $O^{12}$ and again clamp the wire G, but this time as shown on Figs. 14 and 15—that is, a certain distance away from the cutter N—when again the trundle-roll $k'$ passes in the curve $k$ of the cam K and forces the clamp-holders Q toward the cutter N, and thus makes a circumferential bur on the wire G by scraping or cutting an amount of metal from off the wire which makes the head $g'$ by being pressed up tight against the cutter $n^2$, and as soon as this is done the cam E acts on the lever C and makes the cross-head $f'$ retake its former position before the other clamps are released, when the cams operating the cutter N bring it back in its normal position and the cams operating the clamps $h^8$ H and $m\ m'$ release them, when the cross-head $f'$ again begins shoving the wire along a distance equal to the length of a nail.

The clamping-pieces $m$ and $m'$ are adjusted by means of the set-screws P and by means of the screws $p$. As for the cutter N, it is adjusted by means of the set-screws V and clamped by means of the ones $v$, while the piece $n^3$ is clamped by means of the set-screws W and regulated by means of the set-screw $w$.

The throw of the double-forked arm $k^5$ is regulated by means of the slot U and the pieces U', Figs. 1 and 2.

The wire nails are wound around the reel S, which is turned by means of the pusher $s'$, secured to the rod $s^2$, which in turn is secured to the post $s^3$, which is fastened in turn to the cross-head $f'$, and thus favors the clamping of the wire G between the piece $f^5$ and the cross-head $f'$, as it affords a certain resistance to the propulsion of the cross-head $f'$ and thus forces the rocking or oscillating head $f$ down on the front end.

The check pawl or piece $s^4$ prevents the reel S from unwinding.

After the nails are made they pass out of the cutter through the guide-tube $S^5$, Fig. 2.

The small depressions 5, Figs. 9, 11, 13, and 15, in the clamps $m$ and $m'$ can be made smooth or roughened; also, the ends of the thin clamping-pieces $h^3$ and $f^5$ can be smooth or provided with teeth at 6. The same can be said of the bottom of the channels or grooves 3 and $h^9$.

The head of the nail formed by the clamping-pieces $m\ m'$, cutting a thin circumferential portion of metal around the wire and flattening it out against the cutter N, resembles the head of an ordinary tack, a thing that no machine made making endless wire nails does, that I am aware of.

The spring 9 pulls the arm $h^7$ toward the lever $h^4$, when the end $h^3$ of the latter recedes and thus unclamps the wire G.

The beveling on the point of the nails can be made so as to have a corrugated surface or roughened in any suitable way.

Having described my invention, what I claim, and desire to secure by Letters Patent, is—

1. In a wire-nail machine, the combination, with stationary guides, of a cross-head $f'$ slidable therein and provided at its front end with a groove for the wire, a head $f$ pivoted at its lower part to the said cross-head and provided with a clamping-plate depending within the said groove, and a longitudinally-slidable rod pivoted to the upper part of the said head, and operating to clamp and unclamp the wire automatically and to feed it forward, substantially as set forth.

2. In a wire-nail machine, the combination, with a cross-head provided with clamping devices, and an operating-rod pivoted to the said cross-head; of a support provided with a vertical slot, a block slidable in the said slot and provided with means for clamping it to the said support, a lever C slidable in a socket which is pivoted to the said block, said lever having its upper end pivoted to the said rod, and a cam for operating the lower end portion of the said lever and thereby sliding the said cross-head back and forth, substantially as set forth.

3. In a wire-nail machine, the combination, with a stationary clamping-block H provided with a groove in one side of it for the wire, of a pivoted arm provided with a thin clamping-plate at its free end slidable in the said groove, a pivoted operating-lever, a screw engaging with the upper end portion of the said lever and bearing against the said arm, a spring coupling the upper end portions of the said lever and arm, and a cam for operating the lower end portion of the said lever, substantially as set forth.

4. In a wire-nail machine, the combination, with a stationary jaw, a block provided with a channel for the wire and a beveled portion corresponding with the point to be cut, and screws holding the said block vertically and horizontally in the said jaw; of a cross-slide $n$, a cutter N provided with a beveled portion $n'$ on its front side for pressing the wire into the said channel, screws holding the said cutter vertically and horizontally in the said cross-slide; and means for sliding the cross-slide back and forth transversely of the wire, substantially as set forth.

5. In a wire-nail machine, the combination, with a frame, a block $q'$ pivoted horizontally in the frame, and clamp-holders Q pivoted at their lower ends to the said block and provided with opposed clamping-pieces at their upper ends for engaging with the wire; of means for moving the said clamp-holders crosswise of the machine in opposite directions to clamp and to release the wire, an arm arranged longitudinally of the machine and pivotally connected with the upper portions of the said clamp-holders, and means for reciprocating the said arm longitudinally, substantially as set forth.

6. In a wire-nail machine, the combination, with a frame, a block $q'$ pivoted horizontally in the frame, and clamp-holders Q pivoted at their lower ends to the said block and provided with opposed clamping-pieces at their upper ends for engaging with the wire; of two levers pivoted to the frame, screws engaging with the upper end portions of the said levers and bearing against the clamp-holders, springs coupling the upper end portions of the said levers and clamp-holders, cam mechanism for reciprocating the lower end portions of the said levers, an arm arranged longitudinally of the machine and pivotally connected with the upper portions of the said clamp-holders, and means for reciprocating the said arm longitudinally, substantially as set forth.

7. In a wire-nail machine, the combination, with two separate clamping devices, of a cutter for forming the points, said cutter being formed in two parts and arranged between the two said clamping devices, and means for sliding one of the said clamping devices longitudinally of the wire, the said slidable clamping device and the said parts forming the cutter having also the function of dies and operating to form a head on the wire when closed upon it and moved one toward the other, substantially as set forth.

8. The combination with a wire-nail machine provided with longitudinally-movable die mechanism for forming heads on the wire, and a cutter for forming the points; of a reel B for holding the wire and journaled at one end of the machine, a reel S for holding the continuous nails journaled at the other end of the machine, a longitudinally-slidable pusher connected to the said die mechanism and operating to revolve the reel S so as to coil the nails on it, and a check-pawl preventing the reel S from turning backward, substantially as set forth.

In testimony whereof I have affixed my signature in presence of two witnesses.

ISAÏE FRÉCHETTE.

Witnesses:
ALP. WALTER,
JAMES LAURIN.